United States Patent
Ryu et al.

(10) Patent No.: US 9,683,737 B2
(45) Date of Patent: Jun. 20, 2017

(54) CHEMICAL LOOPING COMBUSTION METHOD AND APPARATUS FOR SOLID FUELS USING DIFFERENT OXYGEN CARRIERS

(71) Applicant: Korea Institute of Energy Research, Daejeon (KR)

(72) Inventors: Ho-jung Ryu, Daejeon (KR); Gyoung-tae Jin, Daejeon (KR); Chang-keun Yi, Daejeon (KR); Do-won Shun, Daejeon (KR); Jae-hyeon Park, Daejeon (KR); Dal-hee Bae, Sejong (KR); Sung-ho Jo, Daejeon (KR); Seung-yong Lee, Daejeon (KR); YoungCheol Park, Daejeon (KR); Jong-ho Moon, Seoul (KR); Dong-ho Lee, Daejeon (KR); Ji-bong Joo, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 357 days.

(21) Appl. No.: 14/320,805

(22) Filed: Jul. 1, 2014

(65) Prior Publication Data
US 2015/0010873 A1 Jan. 8, 2015

(30) Foreign Application Priority Data
Jul. 3, 2013 (KR) ........................ 10-2013-0077710

(51) Int. Cl.
*C10L 1/12* (2006.01)
*F23D 3/40* (2006.01)
(Continued)

(52) U.S. Cl.
CPC ............ *F23C 99/00* (2013.01); *F23C 10/005* (2013.01); *F23C 2900/99008* (2013.01); *Y02E 20/346* (2013.01)

(58) Field of Classification Search
USPC ..... 431/170, 2, 4, 5, 7; 423/579, 657, 648.1, 423/219; 252/183.4, 373; 48/210, 61,
(Continued)

(56) References Cited

U.S. PATENT DOCUMENTS

| | | | |
|---|---|---|---|
| 2009/0084666 A1* | 4/2009 | Agrawal | C10B 49/22 201/2.5 |
| 2011/0303875 A1 | 12/2011 | Hoteit et al. | 252/373 |

OTHER PUBLICATIONS

A. Lyngfelt. Oxygen Carriers for Chemical Looping Combustion—4000h of Operational Expirience. Oil & Gas Science and Technology—Rev. IFP Energies nouvelles. vol. 66 (2011). No. 2, pp. 161-172.*

(Continued)

*Primary Examiner* — Avinash Savani
*Assistant Examiner* — Vivek Shirsat
(74) *Attorney, Agent, or Firm* — Harness, Dickey & Pierce, P.L.C.

(57) ABSTRACT

A chemical looping combustion apparatus for solid fuels using different oxygen carriers is provided. The chemical looping combustion apparatus includes: a solid fuel chemical looping combustor configured to receive solid fuels and to produce carbon dioxide and steam by combustion of the solid fuels; a gaseous fuel chemical looping combustor configured to receive gaseous fuels and to produce carbon dioxide and steam by combustion of the gaseous fuels; and a devolatilization reactor configured to produce solids and gases by devolatilizing the solid fuels, and the solid fuels received by the solid fuel chemical looping combustor and the gaseous fuels received by the gaseous fuel chemical looping combustor are the solids and the gases produced by (Continued)

the devolatilization reactor, respectively. Accordingly, a reaction rate and an amount of oxygen transfer can increase, and necessity for low-priced oxygen carriers and a make-up cost of low-priced oxygen carriers can be reduced.

6 Claims, 5 Drawing Sheets

(51) Int. Cl.
  *F27D 1/04* (2006.01)
  *F23C 99/00* (2006.01)
  *F23C 10/00* (2006.01)
(58) Field of Classification Search
  USPC .................................. 48/110, 128; 502/304
  See application file for complete search history.

(56) References Cited

OTHER PUBLICATIONS

Nicolas Bergeurand, and Anderes Lyngfelt. "Chemical-Looping Combustion of Petroleum Coke Using Ilemnite in a 10kWth Unit-High-Temperature Operation". Energy and Fuels. Issue 23. pp. 5257-5268. 2009.*

* cited by examiner

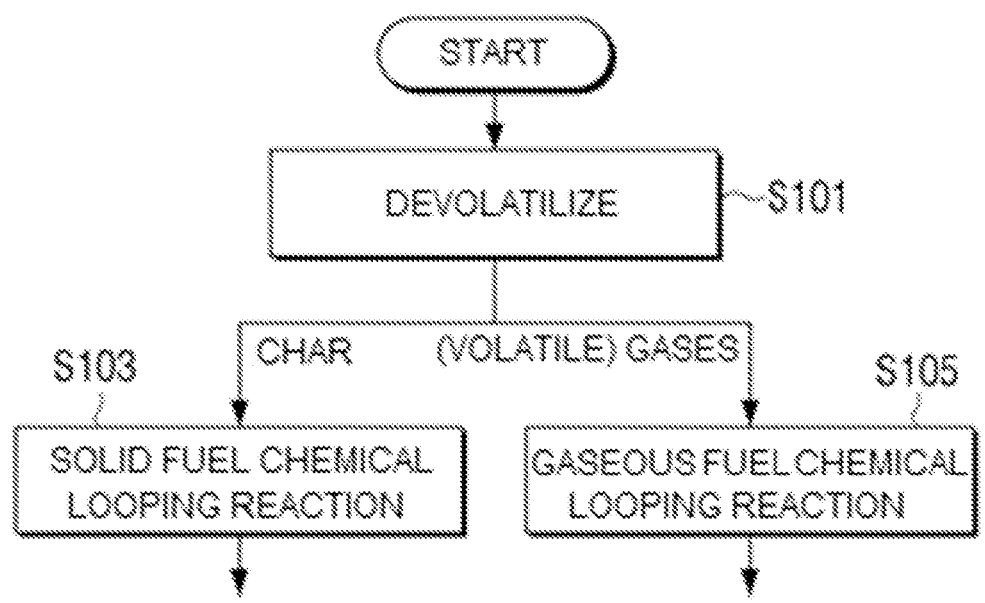

CHEMICAL LOOPING COMBUSTION METHOD AND APPARATUS FOR SOLID FUELS USING DIFFERENT OXYGEN CARRIERS

CROSS-REFERENCE TO RELATED PATENT APPLICATION

This application claims priority from Korean Patent Application No. 10-2013-0077710 filed on Jul. 3, 2013 in the Korean Intellectual Property Office, the disclosure of which is incorporated herein by reference in its entirety.

FIELD

Apparatuses and methods consistent with the exemplary embodiments relate to a chemical looping combustion method and apparatus for solid fuels using different oxygen carriers, and more particularly, to a chemical looping combustion method and apparatus for solid fuels using different oxygen carriers, which can increase a reaction rate and an amount of oxygen transfer, and can reduce necessity for low-priced oxygen carriers and simultaneously reduce a make-up cost of low-priced oxygen carriers.

BACKGROUND

Chemical Looping Combustion (CLC) refers to a technology for inherently separating carbon dioxide during a process without extra separation equipment, and can directly combust solid fuels instead of high-priced gaseous fuels and generate less thermal NOx and has high power generating efficiency. Therefore, CLC may be called a next-generation low-pollution and high-efficiency power generation technology.

In recent years, Solid Fuel Chemical Looping Combustion (SF-CLC), which can directly combust solid fuels instead of high-priced gaseous fuels and can inherently separate carbon dioxide during the solid fuel chemical looping combustion process without extra separation equipment, has been being researched.

A chemical looping combustor is mainly divided into an oxidation reactor and a reduction reactor. In the oxidation reactor, metal oxygen carriers react with oxygen in the air to produce a metallic oxide. The oxidation reactor transfers the metallic oxide to the reduction reactor.

In the reduction reactor, the metallic oxide transferred from the oxidation reactor reacts with solid fuels to produce carbon dioxide and steam, and the metal oxygen carriers reduced in the reduction reactor is transferred back to the oxidation reactor, such that the oxygen carriers are circulated between the reduction reactor and the oxidation reactor. Steam or carbon dioxide is supplied to the reduction reactor to fluidize the solid fuels, and the solid fuels are gasified by such fluidization gas.

FIG. 1 is a view to illustrate a concept of solid fuel chemical looping combustion technology.

Referring to FIG. 1, air flows into an oxidation reactor to fluidize metal solid particles, that is, oxygen carriers (M). In the oxidation reactor, the oxygen carriers M react with oxygen ($O_2$) in the air to produce a metallic oxide (MO) as follows:

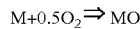

The metallic oxide (MO) produced as in above Equation is transferred to a reduction reactor.

The metallic oxide (MO), solid fuels, and gases for fluidizing the solid fuels flow into the reduction reactor, and gasification reaction by steam and combustion reaction by the oxygen carriers (M) may occur simultaneously. The reaction may occur at high temperature of 600° C. to 1000° C. in the oxidation reactor and the reduction reactor.

First, as for the gasification reaction, the gases flowing into the reduction reactor may be steam or carbon dioxide ($CO_2$). In the reduction reactor, the solid fuels are gasified by the fluidization gas. As the solid fuels, various fuels such as coal, coke, char, biomass, etc., may be used. In exemplary embodiments of the present invention, coal is used by way of an example.

In the reduction reactor, carbon included in the coal reacts with steam (or $CO_2$) to produce CO and $H_2$ (or CO) as in following Equation:

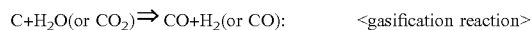

Thereafter, combustion reaction occurs in the reduction reactor. That is, CO and $H_2$ (or CO) produced by the above-described gasification reaction reacts the metallic oxide transferred from the oxidation reactor to produce $CO_2$, $H_2O$, and oxygen carriers (M) as in following Equation:

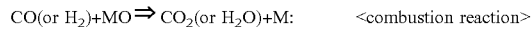

The oxygen carriers (M) produced by the combustion reaction is provided to the oxidation reactor, such that the oxygen carriers (M) are re-circulated.

In the related-art solid fuel chemical looping combustor which operates according to the principle described above with reference to FIG. 1, when solid fuels such as coal, biomass, waste, etc. are continuously supplied to the reduction reactor, gasification reaction occurs between the supplied solid fuels and the oxygen carriers and thus gases such as CO and $H_2$ (or CO) are produced. Thereafter, combustible ingredients included in the gas, such as volatile matter, fixed carbon, etc., react with oxygen included in the oxygen carriers and are changed to gases such as $CO_2$, CO, $H_2O$, etc., and are discharged to the outside of the reactor. However, ash included in the solid fuels is accumulated in the reduction reactor. Accordingly, when the solid fuels are used, it is difficult to separate the oxygen carriers and ash from each other and thus the oxygen carriers and ash staying in the reduction reactor should be periodically or continuously removed.

Therefore, the related-art solid fuel chemical looping combustor uses low-priced oxygen carriers (e.g., iron ore, ilmenite, oxide scale or bauxite, or a compound thereof) which are disposable along with ash rather than using oxygen carriers containing high-priced metal components such as Ni, Co, Fe, Cu, Mn, Ce, etc. and a mixture thereof. However, when the low-priced oxygen carriers are discarded along with ash, a waste disposal cost is incurred, and also, since even the low-priced oxygen carriers should be continuously made up, there is a problem in the economic feasibility of oxygen carriers.

From among the oxygen carriers, the oxygen carriers containing high-priced metal components show excellent characteristics in comparison with low-priced oxygen carriers in terms of a reaction rate and an amount of oxygen that the oxygen carriers can transfer per unit weight. Therefore, even if an amount of solid circulation between the oxidation reactor and the reduction reactor is low, an operation is possible. However, when low-priced oxygen carriers are used for solid fuels, a reaction rate is low and thus a volume of the reactor should increase to guarantee sufficient residence time of the solids. In addition, the solid circulation rate between the oxidation reactor and the reduction reactor should increases to supply sufficient oxygen and thus the power cost increases.

Patent Document 1: US2011-0303875 A (Integrated oxidation, reduction, and gasification method for chemical looping syngas and energy production)

SUMMARY

One or more aspects of the exemplary embodiments provide a chemical looping combustion method and apparatus for solid fuels using different oxygen carriers, which can increase a reaction rate and an amount of oxygen transfer, and reduce necessity for low-priced oxygen carriers and also reduce a make-up cost of low-priced oxygen carriers.

One or more aspects of the exemplary embodiments also provide a solid fuel chemical looping combustor which can be used in a chemical looping combustion apparatus for solid fuels using different oxygen carriers.

According to an aspect of an exemplary embodiment, there is provided a chemical looping combustion apparatus for solid fuels using different oxygen carriers, including: a solid fuel chemical looping combustor configured to receive solid fuels and to produce carbon dioxide and steam by combustion of the solid fuels; a gaseous fuel chemical looping combustor configured to receive gaseous fuels and to produce carbon dioxide and steam by combustion of the gaseous fuels; and a devolatilization reactor configured to produce solids and gases by devolatilizing the solid fuels, wherein the solid fuels received by the solid fuel chemical looping combustor and the gaseous fuels received by the gaseous fuel chemical looping combustor are the solids and the gases produced by the devolatilization reactor, respectively.

Oxygen carriers used in the solid fuel chemical looping combustor and oxygen carriers used in the gaseous fuel chemical looping combustor may be different from each other.

The oxygen carriers used in the solid fuel chemical looping combustor may comprise any one of:
(i) iron ore, ilmenite, oxide scale, or bauxite;
(ii) an oxide of any one of iron ore, ilmenite, oxide scale, and bauxite;
(iii) limestone, dolomite, CaO, $CaCO_3$, MgO, or $MgCO_3$;
(iv) a mixture of at least two of limestone, dolomite, CaO, $CaCO_3$, MgO, and $MgCO_3$; and
(v) a mixture of a support and any one of (i) to (iv);
wherein the support is any one of:
bentonite, alumina, zeolite, silica, hexaaluminate, or zirconia; and
a mixture of at least two of bentonite, alumina, zeolite, silica, hexaaluminate, and zirconia.

The oxygen carriers used in the gaseous fuel chemical looping combustor may comprise any one of:
(i) Fe, Ni, Co, Cu, Mn, or Ce;
(ii) an oxide of any one of Fe, Ni, Co, Cu, Mn, and Ce;
(iii) limestone, dolomite, CaO, $CaCO_3$, MgO, or $MgCO_3$;
(iv) a mixture of at least two of limestone, dolomite, CaO, $CaCO_3$, MgO, and $MgCO_3$; and
(v) a mixture of a support and any one of (i) to (iv);
wherein the support is any one of:
bentonite, alumina, zeolite, silica, hexaaluminate, or zirconia; and
a mixture of at least two of bentonite, alumina, zeolite, silica, hexaaluminate, and zirconia.

The chemical looping combustion apparatus may further include a cyclone configured to receive the gases produced in the devolatilization reactor, separate solids remaining in the received gases, provide the solids to the devolatilization reactor, and provide the gases from which the remaining solids have been removed to the gaseous fuel chemical looping combustor.

The solid fuel chemical looping combustor may include: an oxidation reactor; a loop seal configured to receive a metallic oxide from the oxidation reactor; a reduction reactor configured to cause the solid fuels flowing from the devolatilization reactor and the metallic oxide transferred from the loop seal to react with each other, thereby reducing the oxygen carriers; and a downcomer connected to an outlet of the loop seal and extending to a lower portion of the reduction reactor to receive the solid fuels.

The oxygen carriers reduced in the reduction reactor may be provided to the oxidation reactor such that the oxygen carriers are re-circulated.

The solid fuels may be introduced from a middle portion of the downcomer and then may flow into the reduction reactor.

The metallic oxide conveyed from the loop seal may be stacked on a lower portion of the reduction reactor, which forms a solid bed. A height of the solid bed may be maintained lower than a height of a solid bed formed in the loop seal.

According to one or more exemplary embodiments, by reacting gases fuels and solid fuels separately, a reaction rate and an amount of oxygen transfer can increase, and necessity for low-priced oxygen carriers and a make-up cost of low-priced oxygen carriers can be reduced.

In addition, when the solid fuel chemical looping combustor according to the exemplary embodiments is used, an amount of devolatilized matter to be transferred to the loop seal from among devolatilized matter of the solid fuels can be reduced and most of the devolatilized matter can be conveyed to the reduction reactor.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which:

FIG. 5 is a view to illustrate a chemical looping combustion method for solid fuels using different oxygen carriers according to an exemplary embodiment.

DETAILED DESCRIPTION

Figure 1:
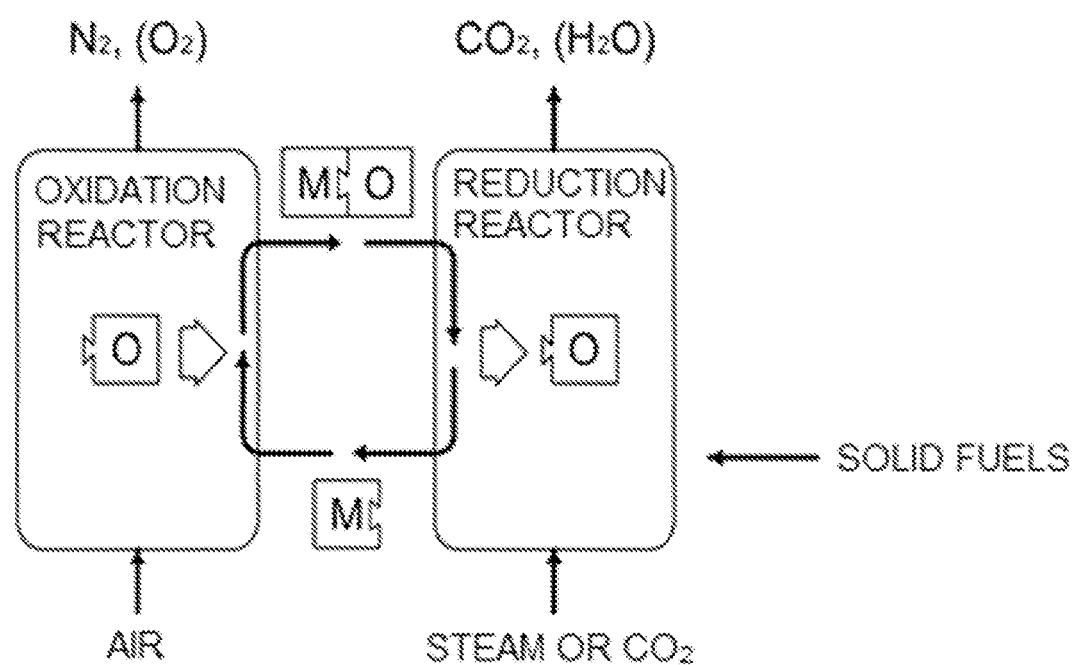
FIG. 1 is a view to illustrate a concept of solid fuel chemical looping combustion technology.

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" another element, the element can be directly on another element or intervening elements. In the drawings, thicknesses of elements are exaggerated for easy understanding of technical features.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 2:
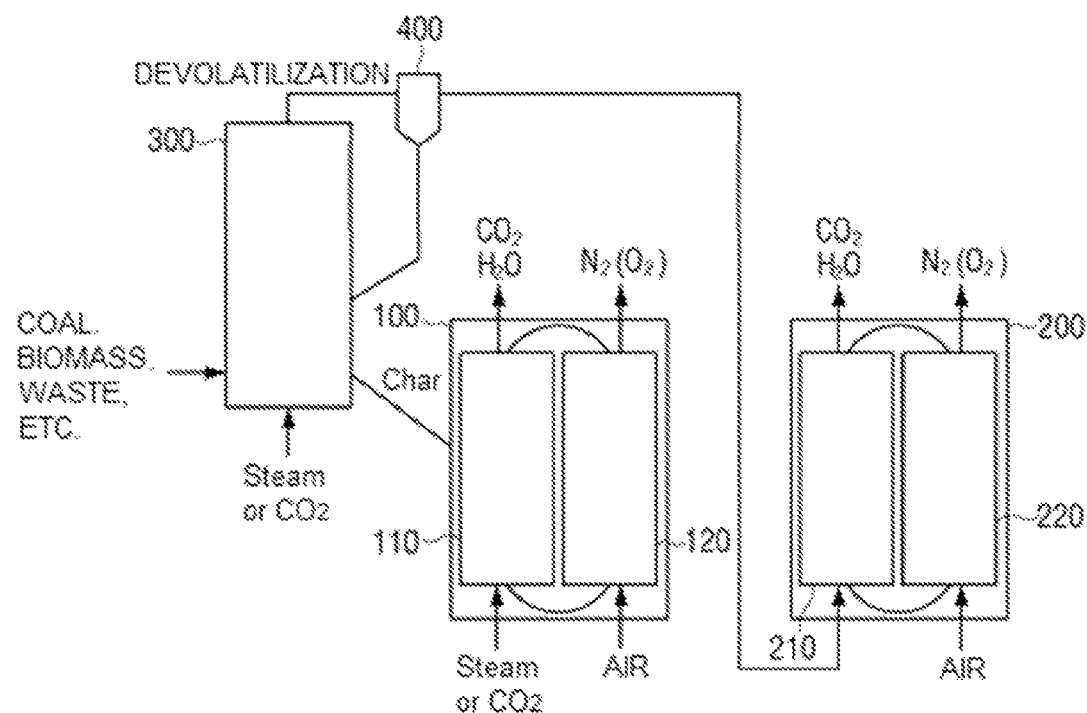
FIG. 2 is a view to illustrate a chemical looping combustion apparatus for solid fuels using different oxygen carriers according to an exemplary embodiment.

FIG. 2 is a view to illustrate a chemical looping combustion apparatus for solid fuels using different oxygen carriers according to an exemplary embodiment.

Referring to FIG. 2, the chemical looping combustion apparatus for solid fuels using different oxygen carriers (hereinafter, referred to as a 'chemical looping combustion apparatus') according to an exemplary embodiment includes a solid fuel chemical looping combustor 100, a gaseous fuel chemical looping combustor 200, a devolatilization reactor 300, and a cyclone 400.

The solid fuel chemical looping combustor 100 may include a reduction reactor 110 and an oxidation reactor 120, may receive solid fuels, and may produce carbon dioxide and steam by combustion of the solid fuels. Herein, the solid fuels may be received from the devolatilization reactor 300 and, for example, may be char.

According to an exemplary embodiment, the solid fuel chemical looping combustor 100 may use low-priced oxygen carriers. For example, the low-priced oxygen carriers may be any one of:
  (i) iron ore, ilmenite, oxide scale, or bauxite;
  (ii) an oxide of any one of iron ore, ilmenite, oxide scale, and bauxite;
  (iii) limestone, dolomite, CaO, $CaCO_3$, MgO, or $MgCO_3$;
  (iv) a mixture of at least two of limestone, dolomite, CaO, $CaCO_3$, MgO, and $MgCO_3$; and
  (v) a mixture of a support and any one of (i) to (iv);
  wherein the support is any one of:
  bentonite, alumina, zeolite, silica, hexaaluminate, or zirconia; and
  a mixture of at least two of bentonite, alumina, zeolite, silica, hexaaluminate, and zirconia.

The gaseous fuel chemical looping combustor 200 may include a reduction reactor 210 and an oxidation reactor 220 in the same or similar way as the solid fuel chemical looping combustor 100, and may receive gaseous fuels and produce carbon dioxide and steam by combustion of the gaseous fuels. The gaseous fuels may be received from the devolatilization reactor 300, and, for example, may be volatile gas.

The gaseous fuel chemical looping combustor 200 is identical or similar to the solid fuel chemical looping combustor 100 in its configuration and function except for that the gaseous fuel chemical looping combustor 200 uses gases instead solids as fuels.

According to an exemplary embodiment, the gaseous fuel chemical looping combustor 200 uses high-priced oxygen carriers having high reactivity. For example, the high-priced oxygen carriers may be any one of:
  (i) Fe, Ni, Co, Cu, Mn, or Ce;
  (ii) an oxide of any one of Fe, Ni, Co, Cu, Mn, and Ce;
  (iii) limestone, dolomite, CaO, $CaCO_3$, MgO, or $MgCO_3$;
  (iv) a mixture of at least two of limestone, dolomite, CaO, $CaCO_3$, MgO, and $MgCO_3$; and
  (v) a mixture of a support and any one of (i) to (iv);
  wherein the support is any one of:
  bentonite, alumina, zeolite, silica, hexaaluminate, or zirconia; and
  a mixture of at least two of bentonite, alumina, zeolite, silica, hexaaluminate, and zirconia.

The solid fuel chemical looping combustor 100 is configured to separate carbon dioxide by performing reduction reaction and oxidation reaction by using the oxygen carriers as described above with reference to FIG. 1. Any device which is well known in the related art can be used as the solid fuel chemical looping combustor 100, or the solid fuels chemical looping combustor according to an exemplary embodiment, which will be described below, may be used.

The devolatilization reactor 300 receives solid fuels such as coal, biomass, or waste and performs a devolatilization process by using heat. Although a heat source is not illustrated, an ordinary skilled person in the related art would use a heat source for the devolatilization reactor 300 according to a purpose.

The devolatilization reactor 300 provides gases (for example, volatile gas) and scattered solids which are generated as a result of performing the devolatilization process to the cyclone 400, and the cyclone 400 separates gases from the solids and provides the gases to the gaseous fuel chemical looping combustor 200. In addition, the cyclone 400 provides the solids except for the gases to the devolatilization reactor 300.

The devolatilization reactor 300 provides char which is produced as a result of performing the devolatilization process to the solid fuel chemical looping combustor 100. Herein, char is in a solid state, including fixed carbon, non-volatile combustible matters and/or ash.

As described above with reference to FIG. 2, the chemical looping combustion apparatus using different oxygen carriers according to an exemplary embodiment receives solid fuels such as coal, biomass, and/or waste, and separates gaseous fuels from the solid fuels through the devolatilization process, and provides the solid fuels and the gaseous fuels to the solid fuel chemical looping combustor and the gaseous fuel chemical looping combustor, respectively. By adopting such a configuration, the solid fuel chemical looping combustor is able to use low-priced oxygen carriers and the gaseous fuel chemical looping combustor is able to high-priced oxygen carriers.

In order to solve the problems caused by the use of low-priced oxygen carriers in the related-art solid fuel chemical looping combustor (a low reaction rate, a small amount of oxygen transfer, an increased reactor size, and an increased amount of solid circulation), the present exemplary embodiment divides the solid fuels into volatile matter and char such that the volatile matter and char are combusted in separate chemical looping combustors. As such, the gaseous fuel chemical looping combustor in which the volatile matter is combusted can use high-priced oxygen carriers to increase a reaction rate and an amount of oxygen transfer, and the solid fuel chemical looping combustor combusts char and reduces an amount of introduced solid fuels so that necessity for low-priced oxygen carriers can be reduced and also a make-up cost of low-priced oxygen carriers can be reduced. In addition, ash may be produced as the solid fuels are used. However, in the present exemplary embodiment, since the low-priced oxygen carriers are used, the make-up cost of the oxygen carriers can be reduced.

Hereinafter, the solid fuel chemical looping combustor will be explained by way of an example with reference to FIGS. 3 and 4. It should be noted that the solid fuel chemical looping combustor used in the chemical looping combustion apparatus using different oxygen carriers according to the exemplary embodiments is not limited to that described with reference to FIGS. 3 and 4.

Figure 3:
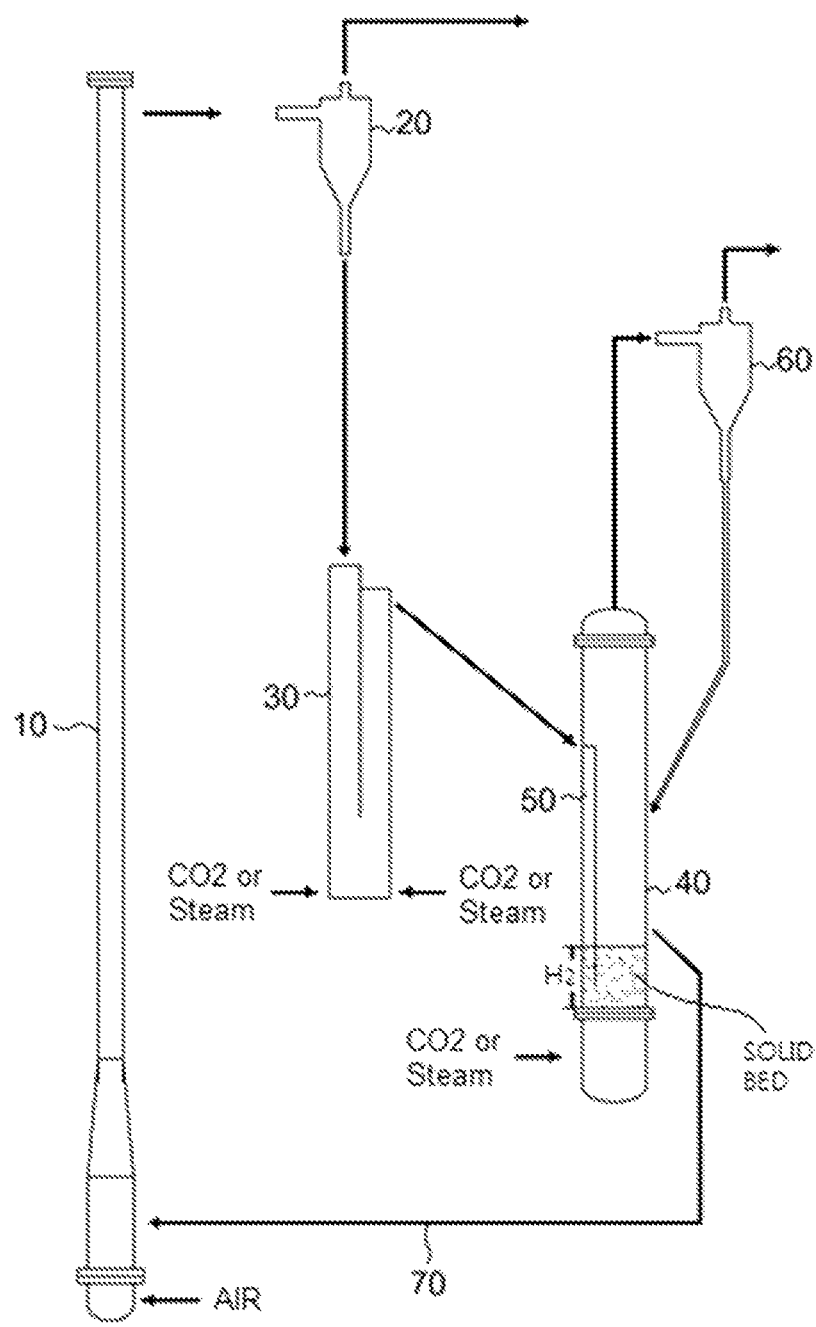
FIG. 3 is a view schematically illustrate a solid fuel chemical looping combustor according to an exemplary embodiment.
Figure 4:
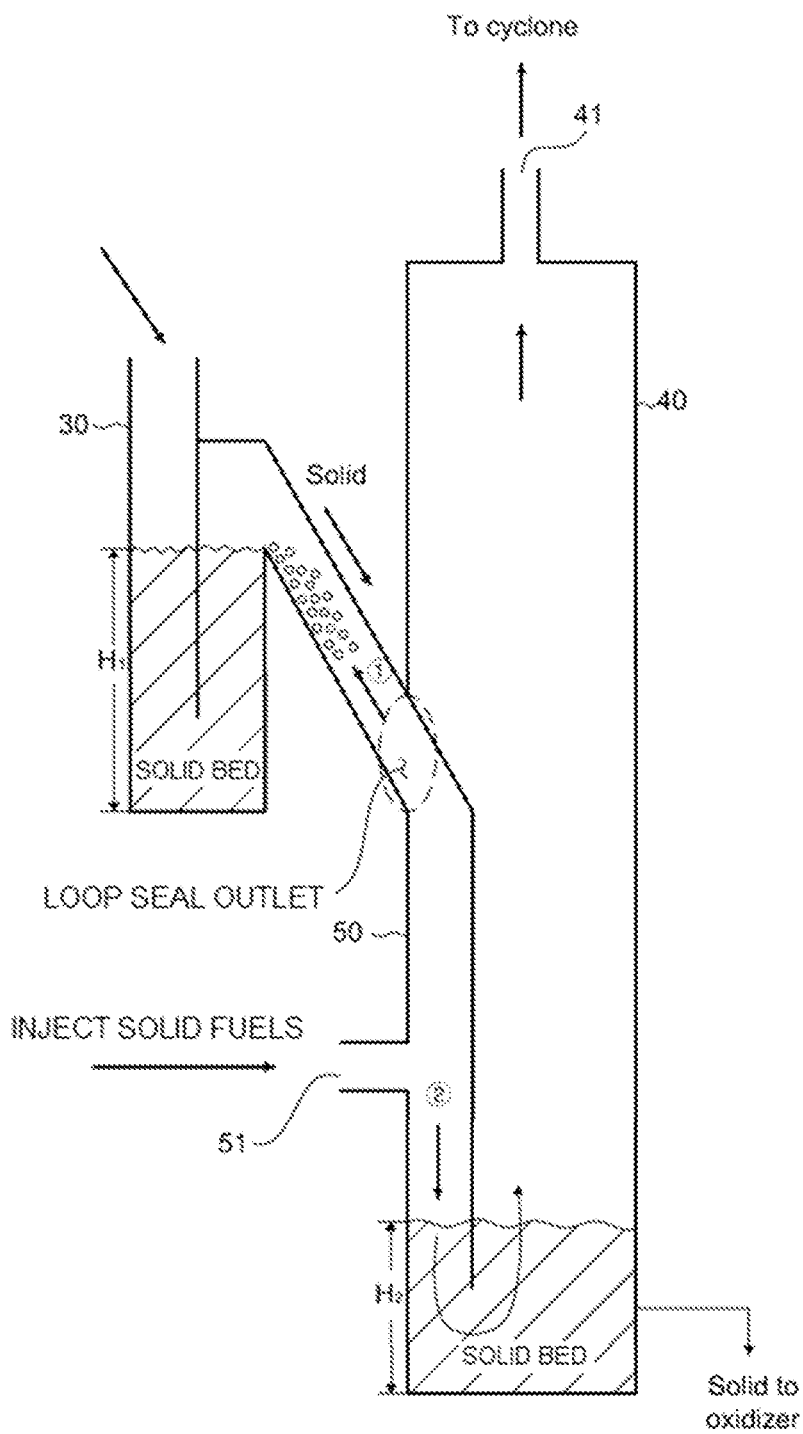
FIG. 4 is a schematic view to illustrate a connection relationship among a loop seal, a downcomer, and a reduction reactor shown in FIG. 3.

FIG. 3 is a view schematically illustrating the solid fuel chemical looping combustor according to an exemplary embodiment, and FIG. 4 is a schematic view to illustrate a connection relationship of a loop seal, a downcomer, and a reduction reactor illustrated in FIG. 3.

Referring to FIGS. 3 and 4, the solid fuel chemical looping combustor according to an exemplary embodiment includes an oxidation reactor 10, a first cyclone 20, a loop seal 30, a reduction reactor 40, a downcomer 50, a second cyclone 60, and a solid recirculation pipe 70.

The oxidation reactor 10 takes a role of causing oxygen carriers and air flowing into the oxidation reactor 10 to react with each other and also takes a role of transferring a metallic oxide produced by the reaction to the first cyclone 20 by shooting up the metallic oxide. To achieve this, the oxidation reactor 10 is usually in the form of a fast fluidized bed. The metallic oxide produced by the reaction of the air flowing into the oxidation reactor 10 and the oxygen carriers is transferred to the first cyclone 20.

The first cyclone 20 collects the scattered metallic oxide transferred from the oxidation reactor 10 and provides the collected metallic oxide to the loop seal 30.

The metallic oxide transferred to the loop seal 30 is fluidized by fluidization gases flowing into the loop seal 30, and the fluidized metallic oxide is transferred to the reduction reactor 40 by gravity. The fluidization gases flowing into the loop seal 30 may be carbon dioxide or steam. In the loop seal 30, a solid bed is formed by the metallic oxide transferred to the loop seal 30.

Assuming that the height of the solid bed in the loop seal is $H_1$, the exemplary embodiment will be explained in detail.

The metallic oxide is transferred from the loop seal 30 to the reduction reactor 40, reacts with the solid fuels, and is then provided to the oxidation reactor 10 via the solid recirculation pipe 70. In this way, the metallic oxide is re-circulated. The reduction reactor 40 reduces the oxygen carriers by causing the solid fuels flowing from the devolatilization reactor 300 and the metallic oxide transferred from the loop seal 30 to react with each other, and provides the reduced oxygen carriers to the oxidation reactor 10. In this way, the oxygen carriers are re-circulated.

The metallic oxide transferred from the loop seal 30 is stacked on a bottom of the reduction reactor 40, forming a solid bed.

Assuming that the height of the solid bed in the reduction reactor 40 is $H_2$, the exemplary embodiment will be explained in detail. The height ($H_2$) of the solid bed in the reduction reactor 40 is maintained lower than the height ($H_1$) of the solid bed in the loop seal 30. In this condition, when a small amount of volatile matter existing in an introduced char is devolatilized, the volatile matter and the solid fuels are likely to move toward $H_2$ of low pressure rather than moving toward $H_1$ of high pressure, and thus they move to the reduction reactor 40.

In addition, steam or carbon dioxide flows under the solid bed in the reduction reactor 40. The seam or carbon dioxide is fluidization gases for fluidizing the solid fuels flowing through the downcomer 50.

The downcomer 50 is connected to an outlet of the loop seal 30 and extends to a lower portion of the reduction reactor 40 so that a lower end of the downcomer 50 is submerged in the solid bed of the reduction reactor 40. However, the lower end of the downcomer 50 is located away from the bottom of the reduction reactor 40 by a pre-defined distance.

The outlet of the loop seal 30 is connected with a hole formed on the reduction reactor 40 and provides a path for conveying the metallic oxide, and the downcomer 50 is fixed to an inner side wall of the reduction reactor 40.

The downcomer 50 transfers the metallic oxide conveyed from the loop seal 30 to the solid bed, and thus the solid bed is formed on the bottom of the reduction reactor 40.

In addition, an inlet 51 is formed on a middle portion of the downcomer 50 to allow the solid fuels, char, to be drawn in therethrough. The solid fuels flowing through the inlet 51 moves to the solid bed of the reduction reactor 40 via the downcomer 50, reacts with the metallic oxide in the solid bed, and moves up to an upper portion of the reduction reactor 40.

Specifically, when the solid fuels flow in through the inlet 51 while the metallic oxide is conveyed from the loop seal 30 to the solid bed via the outlet of the loop seal 30 and the downcomer 50, the solid fuels drop down to the lower portion of the downcomer 50 by gravity.

While the solid fuels flow in through the inlet 51, a small amount of volatile matter existing in the char is devolatilized, and the devolatilized solid fuels may move in the direction of ① or ② illustrated. In this case, since $H_1 > H_2$, the devolatilized solid fuels are likely to move to where the height of the solid bed is low, that is, the solid bed of the reduction reactor 40 with low pressure drop. In addition, the gas flow in the direction of ② is more active than the gas flow in the direction of ① due to the downflow of the metallic oxide (or oxygen carriers) supplied from the loop seal 30. Accordingly, the devolatilized solid fuels move more in the direction of ② to the reduction reactor 40 than in the direction of ① to the loop seal 30.

In addition, the solid fuels moving down to the solid bed in the reduction reactor 40 via the downcomer 50 causes gasification reaction with steam or carbon dioxide while passing through the solid bed, thereby producing carbon monoxide or $H_2$, which moves up the upper portion of the reduction reactor 40. The metallic oxide transferred to the solid bed of the reduction reactor 40 causes combustion reaction with the carbon monoxide or $H_2$ produced by the gasification reaction, thereby producing carbon dioxide (or $H_2O$), which moves up to the upper portion of the reduction reactor 40.

Accordingly, since the residence time of the solid fuels and gases in the reduction reactor 40 extends, the reactivity is improved and thus a fuel conversion rate and a carbon dioxide selectivity increase.

The carbon dioxide (or H₂O) produced by the combustion reaction in the reduction reactor 40 is conveyed to the second cyclone 60 via an outlet 41 of the reduction reactor 40, and the oxygen carriers are provided to the oxidation reactor 10. In this way, the oxygen carriers are re-circulated.

The second cyclone 60 separates the solids and the gases conveyed from the reduction reactor 40 from each other. The second cyclone 60 may discharge the separated gases to the outside, while returning the solids to the reduction reactor 40.

FIG. 5 is a flowchart to illustrate a chemical looping combustion method for solid fuels using different oxygen carriers according to an exemplary embodiment.

Referring to FIG. 5, the devolatilization reactor 300 performs devolatilization with respect to coal, biomass, and/or waste (S101).

The resulting matter in operation S101 is divided to gases (for example, volatile gas) or solids (for example, char), and the solids produced in operation S101 is supplied to the solid fuel chemical looping combustor 100 and solid fuel chemical looping reaction is performed (S103), and the gases produced in operation S101 are supplied to the gaseous fuel chemical looping combustor 200 and gaseous fuel chemical lopping reaction is performed (S105).

While exemplary embodiments have been particularly shown and described above, it will be understood by those of ordinary skill in the art that various changes in form and details may be made therein without departing from the spirit and scope of the present invention as defined by the following claims.

What is claimed is:

1. A chemical looping combustion apparatus for solid fuels using different oxygen carriers, comprising:
   a solid fuel chemical looping combustor configured to receive solid fuels and to produce carbon dioxide and steam by combustion of the solid fuels;
   a gaseous fuel chemical looping combustor configured to receive gaseous fuels and to produce carbon dioxide and steam by combustion of the gaseous fuels; and
   a devolatilization reactor configured to produce solids and gases by devolatilizing the solid fuels,
   wherein the solid fuels received by the solid fuel chemical looping combustor and the gaseous fuels received by the gaseous fuel chemical looping combustor are the solids and the gases produced by the devolatilization reactor, respectively,
   wherein the solid fuel chemical looping combustor comprises:
   an oxidation reactor;
   a loop seal configured to receive a metallic oxide from the oxidation reactor;
   a reduction reactor configured to cause the solid fuels flowing from the devolatilization reactor and the metallic oxide transferred from the loop seal to react with each other, thereby reducing the oxygen carriers;
   a downcomer connected to an outlet of the loop seal and extending to a lower portion of the reduction reactor to receive the solid fuels,
   wherein the oxygen carriers reduced in the reduction reactor are provided to the oxidation reactor such that the oxygen carriers are re-circulated, and
   wherein the solid fuels are introduced into the reduction reactor from a middle point of a longitudinal length of the downcomer.

2. The chemical looping combustion apparatus of claim 1, wherein oxygen carriers used in the solid fuel chemical looping combustor and oxygen carriers used in the gaseous fuel chemical looping combustor are different from each other.

3. The chemical looping combustion apparatus of claim 1, wherein the oxygen carriers used in the solid fuel chemical looping combustor comprise any one of:
   (i) iron ore, ilmenite, oxide scale, or bauxite;
   (ii) an oxide of any one of iron ore, ilmenite, oxide scale, and bauxite;
   (iii) limestone, dolomite, CaO, $CaCO_3$, MgO, or $MgCO_3$;
   (iv) a mixture of at least two of limestone, dolomite, CaO, $CaCO_3$, MgO, and $MgCO_3$; and
   (v) a mixture of a support and any one of (i) to (iv);
   wherein the support is any one of:
   bentonite, alumina, zeolite, silica, hexaaluminate, or zirconia; and
   a mixture of at least two of bentonite, alumina, zeolite, silica, hexaaluminate, and zirconia.

4. The chemical looping combustion apparatus of claim 1, wherein the oxygen carriers used in the gaseous fuel chemical looping combustor comprise any one of:
   (i) Fe, Ni, Co, Cu, Mn, or Ce;
   (ii) an oxide of any one of Fe, Ni, Co, Cu, Mn, and Ce;
   (iii) limestone, dolomite, CaO, $CaCO_3$, MgO, or $MgCO_3$;
   (iv) a mixture of at least two of limestone, dolomite, CaO, $CaCO_3$, MgO, and $MgCO_3$; and
   (v) a mixture of a support and any one of (i) to (iv);
   wherein the support is any one of:
   bentonite, alumina, zeolite, silica, hexaaluminate, or zirconia; and
   a mixture of at least two of bentonite, alumina, zeolite, silica, hexaaluminate, and zirconia.

5. The chemical looping combustion apparatus of claim 1, further comprising a cyclone configured to receive the gases produced in the devolatilization reactor, separate solids remaining in the received gases, provide the solids to the devolatilization reactor, and provide the gases from which the remaining solids have been removed to the gaseous fuel chemical looping combustor.

6. The chemical looping combustion apparatus of claim 1, wherein a first solid bed is formed on a lower portion of the reduction reactor and the metallic oxide conveyed from the loop seal is stacked on the solid bed, and
   a height of the first solid bed that is measured from a bottom of the reduction reactor is maintained lower than a height of a second solid bed formed in the loop seal, wherein the height of the second solid bed means a height measured from the bottom of the loop seal.

* * * * *